United States Patent [19]

Hansen Arne

[11] Patent Number: 4,506,917
[45] Date of Patent: Mar. 26, 1985

[54] PIPE CONNECTION FITTING

[75] Inventor: Hansen Arne, Doylestown, Pa.

[73] Assignee: Interfit, Inc., Norristown, Pa.

[21] Appl. No.: 400,985

[22] Filed: Jul. 22, 1982

[51] Int. Cl.³ .............................................. F16L 41/00
[52] U.S. Cl. ....................................... 285/4; 285/198; 411/393
[58] Field of Search ..................... 285/198, 199, 197, 4

[56] References Cited

U.S. PATENT DOCUMENTS

| | | | |
|---|---|---|---|
| 914,151 | 3/1909 | Mathews | 285/198 X |
| 2,644,720 | 7/1953 | Carr | 285/198 X |
| 3,471,176 | 10/1969 | Gilchrist | 285/197 X |
| 3,480,036 | 11/1969 | Ehrens et al. | 285/198 X |
| 3,999,785 | 12/1976 | Blakeley | 285/197 X |
| 4,157,195 | 6/1979 | Costanzo et al. | 285/198 X |
| 4,304,424 | 12/1981 | Hansen | 285/404 X |

FOREIGN PATENT DOCUMENTS

| | | | |
|---|---|---|---|
| 506067 | 1/1957 | Italy | 285/197 |
| 1076528 | 7/1967 | United Kingdom | 285/198 |

Primary Examiner—Thomas F. Callaghan
Attorney, Agent, or Firm—John F. A. Earley; John F. A. Earley, III

[57] ABSTRACT

A pipe connection fitting for connecting a branch pipe to a main pipe has a body with a nipple adapted to enter a branch opening in a main pipe and a bore in communication with the nipple for the connection of a branch conduit to the body. A seal surrounding the nipple for sealing against the pipe is mounted on the body. A pair of opposed ears are integral with the body. A strap has its free ends removably secured to the ears respectively. The strap has a threaded opening midway between the ends thereof with a break-away screw threaded through the threaded opening for engaging the pipe to secure the body to the pipe.

1 Claim, 3 Drawing Figures

PIPE CONNECTION FITTING

TECHNICAL FIELD

This invention is in the field of pipe fittings.

BACKGROUND OF THE PRIOR ART

Strap type pipe connection fittings are known in the prior art as seen, for example, from Hayden U.S. Pat. No. 1,178,234 wherein the ends of the strap are threaded for the reception of retaining nuts. Such a structure is time consuming to assemble and is disadvantageous in that it applies unequal forces on the seal resulting in poor seal loading. Reference may be had to U.S. Pat. Nos. 3,999,785 and 4,158,461 for similar structures. It is also known to use a strap-like structure with a single bolt and nut to secure a branch connection fitting to a pipe as seen in U.S. Pat. Nos. 1,831,641 and 3,471,176. This type of arrangement results in poor sealing due to unequal forces being applied to the seal. It is known to have a branch sleeve fitting which slips over a main pipe and has a fitting in the branch opening which bears on a gasket which in turn bears on the main pipe to hold the fitting to the pipe. This is disadvantageous due to the inability to secure the fitting except by sliding onto the pipe and may result in backing out the fitting when removing the branch connection which may damage gasket and cause leaking. It is also known to use break-away screws to load a securing device to a predetermined force.

In accordance with this invention, the problems of the prior art are solved by providing a strap which is readily attached and removed from the branch fitting body and which is centrally loaded, advantageously with a break-away screw.

BRIEF SUMMARY OF THE INVENTION

A pipe connection fitting for connecting a branch pipe to a main pipe has a body with a nipple adapted to enter a branch opening in a main pipe and a bore in communication with the nipple for the connection of a branch conduit to the body. A seal surrounding the nipple for sealing against the pipe is mounted on the body. A pair of opposed ears are integral with the body. A strap has its free ends removably secured to the ears respectively. The strap has a threaded opening midway between the ends thereof with a break-away screw threaded through the threaded opening for engaging the pipe to secure the body to the pipe.

DETAILED DESCRIPTION OF THE PREFERRED EMBODIMENT

Figures 1, 2:
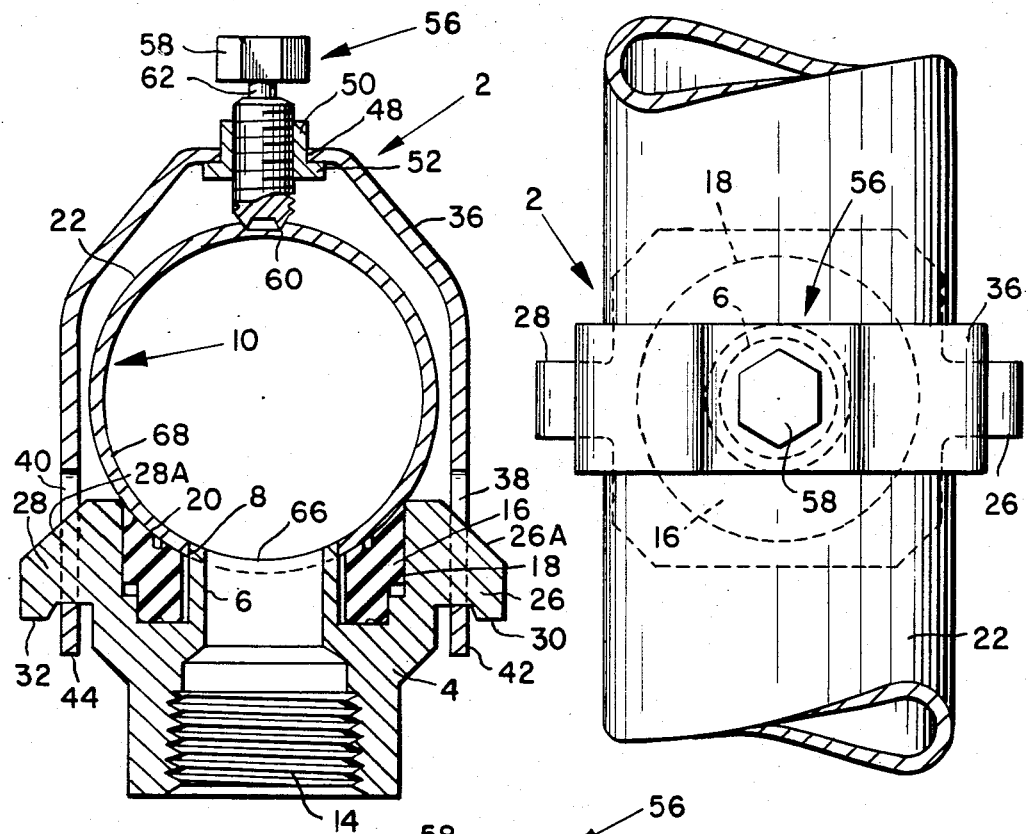
FIG. 1 is a vertical section through a pipe connection fitting in accordance with the invention mounted on a main pipe.
FIG. 2 is a top plan view of the fitting and pipe of FIG. 1.
Figure 3:
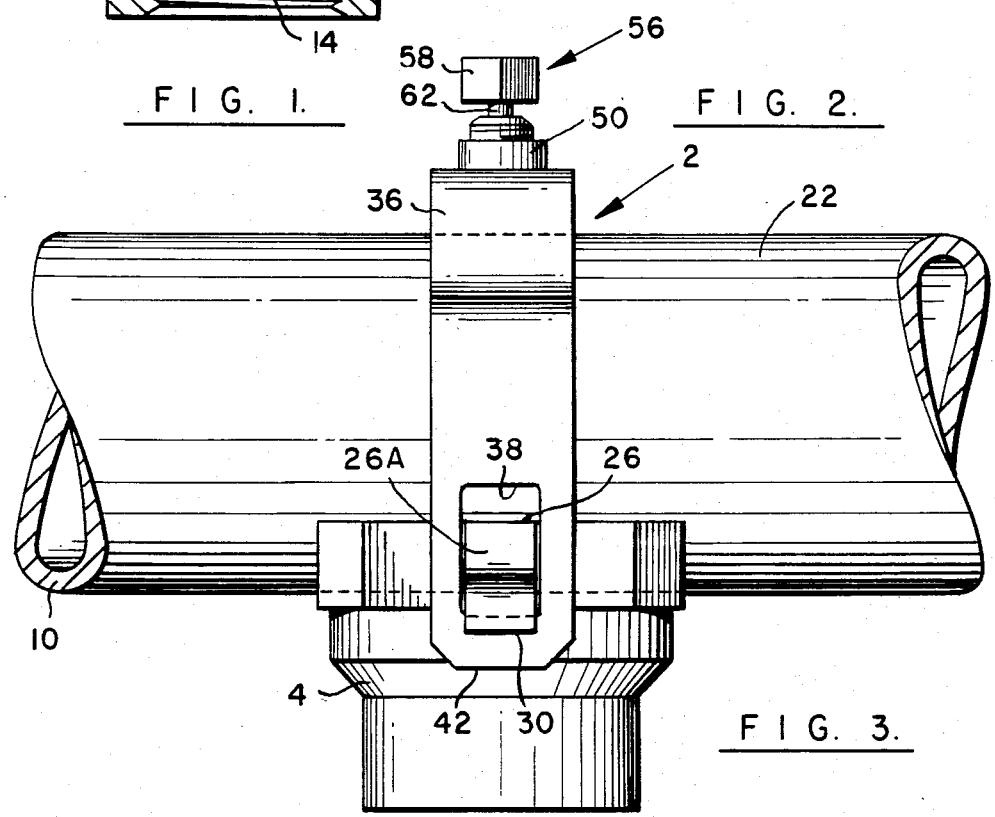
FIG. 3 is a side elevation of the fitting and pipe of FIG. 1.

Referring to FIG. 1, a connection fitting 2 in accordance with the invention has a body 4 provided with a nipple 6 which is shown in a branch opening 8 of a main pipe 10. Body 4 has a threaded bore portion 14 in communication with nipple 6 for connecting a branch conduit to the fitting. Other means for connecting a branch conduit to the fitting may be employed as for example telescoping the branch conduit in the fitting and welding. A circular seal 16 is mounted in a circular groove 18 adjacent nipple 6. Seal 16 is provided with a pipe engaging face 20 which is contoured to conform to the outer surface 22 of pipe 10.

Body 4 has a pair of integral ears 26, 28 with depending lobe portions 30 and 32 respectively and cam portions 26A and 28A respectively to facilitate the downward movement of strap ends 42 and 44. A strap 36 has openings 38 and 40 adjacent strap ends 42 and 44, respectively which are adapted to receive ears 26 and 28. Strap 36 has an opening 48 in which a nut 50 having a flange 52 is secured by a pressed fit. A break-away screw 56 is threaded through nut 50. Screw 56 has a hexagonal head 58 and an inner cutter end 60. A reduced diameter neck portion 62 is designed to break under a predetermined torque for example from 15 to 20 foot pounds. Advantageously, as shown in FIG. 1 the inner end 66 of nipple 6 is contoured to conform to the inner surface 68 of pipe 10.

OPERATION

Fitting 2 is readily assembled to pipe 10 by attaching body 4 to pipe 10 with nipple 6 in opening 8. With break-away screw 56 threaded well out in nut 50, ends 42 and 44 of strap 36 are moved downwardly into engagement with ears 26 and 28 and are cammed outwardly by cam portions 26A and 28A until openings 38 and 40 are in position to receive the ears at which point they spring inwardly. Alternatively, strap 36 may be engaged to ear 26 and then end 44 cammed over ear 32 for engagement therewith. Break-away screw 56 is then turned with a wrench raising the ends 42 and 44 of strap 36 until they are abutting against the ears at a point above lobes 30 and 32 so that the strap ends cannot move outwardly. Continued tightening of screw 56 cuts end 60 into pipe 10 and forces the outer surface 22 of pipe 10 into tight engagement with seal 16. At a predetermined torque, screw 56 will break at neck 62 leaving the assembly in a condition such that it cannot be casually removed.

If it is desired to remove fitting 2, screw 56 can be engaged and turned outwardly with a pair of pliers or the like until strap 36 can be released from body 4 so that the body can be removed from the pipe.

While a wide variety of materials obviously may be used, it is preferred to cast body 4 using ductile iron. It is preferred to make the strap from cold rolled low carbon steel. Advantageously, the break-away screw is case hardened steel. Typically the seal 16 may be rubber or a plastic material such as ethylene acrylic of 62 durometer.

It will be understood that the above described embodiment is illustrative and is not intended to be limiting.

I claim:

1. A pipe connection fitting for connecting a branch pipe to a main pipe comprising:
   a body having a nipple adapted to enter a branch opening in a pipe and a bore in communication with the nipple for the connection of a branch pipe to the body;
   a seal mounted on said body surrounding the nipple for sealing against the pipe;
   a pair of opposed ears integral with said body;
   a strap having an opening adjacent each end to receive an ear;

said ears each having a tapered cam portion to cam the ends of the strap outwardly as the strap is moved downwardly until the strap openings engage the ears;

said ears having depending lobe portions which prevent the strap ends from moving outwardly, said strap having a threaded opening midway between the ends thereof; and a break-away screw threaded through said strap opening and adapted to engage the pipe to secure the body to the pipe, said screw having a head portion which will break off at a predetermined torque, said bore being threaded to receive a branch pipe, said screw having a cutter end pipe adapted to cut into the main pipe until the head portion of the screw breaks off at a predetermined torque.

* * * * *